United States Patent [19]

Ogawa et al.

[11] Patent Number: 4,610,857
[45] Date of Patent: Sep. 9, 1986

[54] METHOD FOR MAKING ULTRA-FINE CERAMIC PARTICLES

[75] Inventors: Masahiro Ogawa, Toyoake; Susumu Abe, Toyota, both of Japan

[73] Assignee: Toyota Jidosha Kabushiki Kaisha, Toyota, Japan

[21] Appl. No.: 701,511

[22] Filed: Feb. 14, 1985

[30] Foreign Application Priority Data

Feb. 22, 1984 [JP] Japan .................................. 59-31942

[51] Int. Cl.[4] ................ C01B 13/20; C01B 21/06; C01B 31/30; C01G 1/02
[52] U.S. Cl. ........................... 423/335; 204/164; 423/409; 423/411; 423/412; 423/440; 423/592; 423/605; 423/610; 423/622; 423/625; 423/636
[58] Field of Search .............. 423/335, 409, 411, 412, 423/440, 592, 605, 610, 622, 625, 636; 204/157.16, 164

[56] References Cited

U.S. PATENT DOCUMENTS

| | | | |
|---|---|---|---|
| 3,434,950 | 3/1969 | Weinberg et al. | 204/164 |
| 3,848,068 | 11/1974 | Rice | 423/335 |
| 4,164,553 | 8/1979 | Perugini et al. | 423/440 |
| 4,202,190 | 6/1980 | Harvey et al. | 423/344 |

OTHER PUBLICATIONS

Yoshida et al, Journal of Materials Science, 14, No. 7 (Jul. 1979), pp. 1624–1630.
Vissokov et al, Journal of Materials Science, 16, No. 6 (Jun. 1981), pp. 1716–1719.

Primary Examiner—Howard S. Williams
Attorney, Agent, or Firm—Oblon, Fisher, Spivak, McClelland & Maier

[57] ABSTRACT

A method for making ultra-fine ceramic particles, in which metal powder constituting a portion of the ultra-fine ceramic particles intended for production is injected at a rate of not less than 70 grams per minute into a plasma jet so that the metal powder is vaporized. The vaporized metal powder is then mixed with a reactive gas, which includes an element consituting the other portion of the ultra-fine ceramic particles, filled in the surrounding area of the plasma jet, and thereby the vaporized metal powder and the reactive gas produce a synthetic reaction. The ultra-fine ceramic particles are produced continuously because of the reaction flame.

10 Claims, 1 Drawing Figure

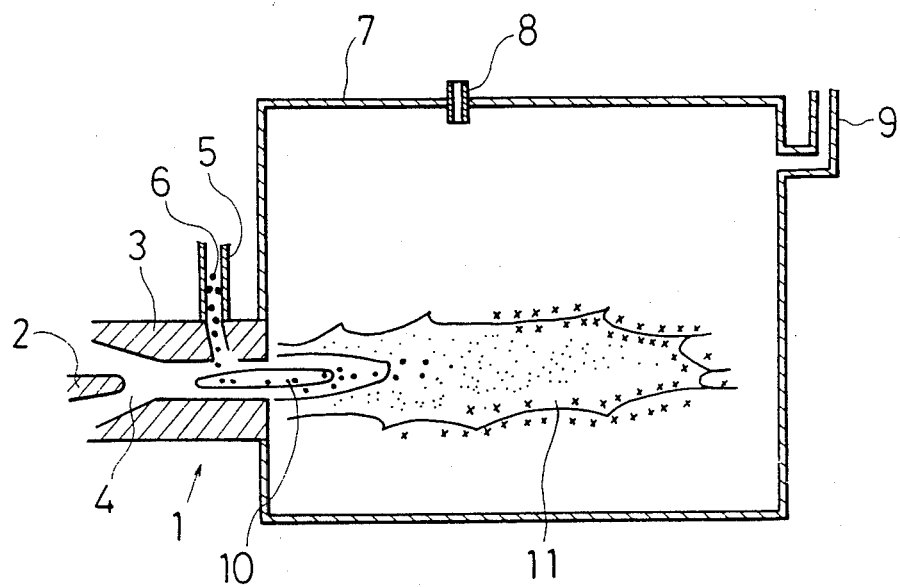
FIGURE

METHOD FOR MAKING ULTRA-FINE CERAMIC PARTICLES

BACKGROUND OF THE INVENTION

1. Field of the Invention

This invention relates to a method for making ultra-fine ceramic particles by the application of plasma.

2. Description of the Prior Art

Ultra-fine ceramic particles with a particle diameter of less than 1,000 angstrom can be sintered easily at relatively low temperatures due to a large contribution of the surface energy thereof. The catalytic activities of the particles are also enhanced at relatively low temperatures for the same reason. Accordingly, the mass-production of ultra-fine ceramic particles at a low cost is widely desired.

The vacuum deposition (metallizing) method, for example, is a well-known procedure for making ultra-fine ceramic particles. This technique makes use of a slow deposition of the particles on a base at reduced pressures. This technique, however, is not suitable for mass production because it utilizes reduced pressures to effectively evaporate raw materials and consumes a large quantity of thermal energy, and because the formation rate of the particles is slow and the production rate of particles is low.

Another technique with an improved formation rate of ultra-fine ceramic particles utilizes a plasma jet. Metal powder is injected into a plasma jet to vaporize the metal in the technique. The metal vapor is then mixed with a reactive gas such as nitrogen in order to produce ultra-fine ceramic particles. *Plasma Chemistry and its Application* (Japanese title: *Purazume Kagaku to Sono Oyo*) published by Shoka-bo in Japan on Sept. 25, 1971 discloses a technique for making ultra-fine ceramic particles of TiN and $Mg_3N_2$. In this technique, 200-mesh titanium or magnesium powder is injected into nitrogen plasma by a nitrogen carrier gas at a flow rate of 5 L/min, an electrical input of 12 KW, and a powder injection rate of 0.5 g/min. The extraction rates thereof were 30% for TiN and 40% for $Mg_3N_2$ according to the book. However, it is considered to be difficult to employ this technique on a profitable basis. Although this technique of utilizing plasma as its heat source is more productive than the vacuum deposition method, this technique still produces a relatively small quantity of ultra-fine ceramic particles, because a relatively small quantity of metal powder is injected from the point of view that all the metal powder is vaporized.

SUMMARY OF THE INVENTION

Accordingly, it is the primary object of the present invention to provide a method for producing ultra-fine ceramic particles, which overcomes the above-mentioned disadvantages.

It is a further object of the present invention to provide a method for efficiently making ultra-fine ceramic particles.

It is a still further object of the present invention to provide a method for continuously making ultra-fine ceramic particles.

It is another object of the present invention to provide a method for making ultra-fine ceramic particles at a low cost.

This invention achieves this object by the following means:

Metal powder constituting a portion of an intended ultra-fine ceramic particles is injected into a plasma jet and the metal powder is thereby vaporized. The vaporized metal powder is then mixed with a reactive gas, which includes an element constituting the other portion of the intended ultra-fine ceramic particles, filled in the surrounding area of the plasma jet. The vaporized metal powder and the reactive gas thereby make a synthetic reaction. Because this reaction is an exothermic reaction, the reaction flame is thereby maintained, and the ultra-fine ceramic particles are produced continuously because of the reaction flame.

In this reaction, almost all kinds of metal can be employed for the metal powder constituting a portion of the intended ultra-fine ceramic particles. Metals which can be employed for the metal powder include silicon, titanium, zinc, magnesium, manganese, chromium, vanadium, aluminum, and the like.

The metal powder is injected into a plasma jet, for example, by means of a carrier gas. The reaction flame is difficult to maintain if the injection rate is less than 70 g/min. The reaction flame becomes larger and achieves stability when the injection rate is equal to or exceeds 180 g/min. Accordingly, it may be necessary that the injection rate is not less than 70 g/min. And it is desirable that the injection rate is not less than 180 g/min. Metal powder having particle sizes not more than 400 microns is preferred for obtaining the ultra-fine ceramic particles.

The carrier gas may be used for injecting metal powder into the plasma jet. Either inert gas or reactive gas can be utilized as the carrier gas. Preferably, the metal powder should be continuously injected into the plasma jet. However, it may be injected intermittently. The intermittent injection should be done at intervals not exceeding 1 second. The reaction flame can achieve prolonged stability at intervals shorter than 1 second.

The ambience around the plasma jet is filled with a reactive gas which includes an element constituting the other portion of the ultra-fine ceramic particles intended for production. The element constituting the other portion of the ultra-fine ceramic particles can be oxygen, nitrogen, carbon and the like. Reactive gases including these elements are gaseous oxygen, gaseous nitrogen, gaseous ammonia, hydrocarbon, carbon monoxide, and the like. Oxides, nitrides, carbides or the likes can be obtained according to the type of a reactive gas employed.

In the process of this invention, a metal powder injected into a plasma jet is then vaporized. The vaporized metal powder then reacts with a reactive gas, thereby producing ultra-fine ceramic particles. This synthetic reaction generates heat. Accordingly, the reaction of vaporized metal powder and the reactive gas is promoted by the heat, thereby forming a reaction flame around the plasma jet. Once the reaction flame is formed, such achieves stability and the ultra-fine particles are produced continuously by the effects of the plasma jet and the heat generated by the synthesis of the ultra-fine ceramic particles.

An advantage of this invention is that the ultra-fine ceramic particles can be produced at a low cost. Plasma is the only thermal energy necessary for the synthesis of ultra-fine ceramic particles by this technique. The vaporization of metal powder is achieved by the heat generated by the reaction of the vaporized metal powder and a reactive gas. The thermal efficiency of this method is extremely high.

Another advantage of this invention is that homogeneous ultra-fine ceramic particles can be mass-produced continuously with high efficiency due to the stable reaction flame.

A further advantage of this invention is that cost-efficient production of ultra-fine ceramic particles can be achieved.

Apparatuses applying this technique are simpler than apparatuses used in conventional physical production methods such as the vacuum deposition method because this invention can be applied at atmospheric pressures.

BRIEF DESCRIPTION OF THE DRAWING

The sole FIGURE is a schematic structural view of an apparatus for making ultra-fine ceramic particles employed in the examples according to this invention.

DESCRIPTION OF THE PREFERRED EMBODIMENT

A technique for making ultra-fine silicon dioxide particles are described hereunder as an example of the method for making ultra-fine ceramic particles by this invention.

With reference to the drawing, a nozzle 1 of a plasma-injecting apparatus comprises a tungsten cathode 2 and a copper anode 3. Plasma gas is injected through the passage 4 formed by the tungsten cathode 2 and the copper anode 3. The passage of the injection pipe 5 is connected with the copper anode 3. The passage of the injection pipe 5 is extended through the copper anode 3 to form an opening at a portion of the passage 4. A metal powder 6 and the carrier gas are injected through the injection pipe 5. An end of the nozzle 1 is connected with a closed vessel 7. The passage 4 is extended into the inside of the closed vessel 7. A reactive gas injecting pipe 8 and the exhaust pipe 9 are respectively jointed to the closed vessel 7.

An apparatus for making ultra-fine ceramic particles as composed above was employed in producing ultra-fine silicon dioxide particles.

First, the closed vessel 7 was filled with air containing oxygen. Then, a mixture of a primary gas and a secondary gas was injected through the passage 4 formed by the tungsten cathode 2 and the copper anode 3. More specifically, 54 L/min of argon gas (the primary gas) and 5 L/min of hydrogen gas (the secondary gas) were injected through the passage 4. Thereupon, an electric current of approximately 50 V 600 A was conducted between the tungsten cathode 2 and the copper anode 3 to generate plasma. The plasma spurted up into the closed vessel 7 in a form of a plasma jet 10. Then, silicon powder with an average particle diameter of 100 microns was injected into the closed vessel 7 by means of a nitrogen carrier gas. The nitrogen gas was injected at 0.9 L/min and the silicon powder was injected at 180 g/min. Then, the silicon powder and the oxygen reacted and produced a large reaction flame 11 around the plasma jet 10, thereby producing the ultra-fine silicon dioxide particles. This reaction is exothermic reaction. The evaporation of the silicon powder was thereby enhanced by the heat generated by this thermal reaction and the reaction flame 11 was maintained by the heat of the plasma jet 10 and the thermal energy of the reaction. The vapor of the ultra-fine silicon dioxide particles thus produced was then cooled by the surrounding air, and particle growth was thereby inhibited. The ultra-fine silicon dioxide thus made was deposited on the surface of water-cooled pipes (not shown), which were later extracted.

As a result of this production method, ultra-fine silicon dioxide particles with an average particle diameter of 500 angstrom were obtained at a composition rate of 97%. The production rate was 390 g/min which is approximately 100 times faster than conventional techniques for making ultra-fine ceramic particles. The production rate for ultra-fine ceramic particles by the technique described in this invention far exceeds the production rate of other conventional techniques.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come with the meaning and range of equivalency of the claims are therefore intended to be embraced therein. For example, the metal powder may be injected intermittently although it was injected continuously in the present embodiment.

What is claimed is:

1. A method for producing ultra-fine ceramic particles which comprises the steps of:
   forming a plasma jet in a reaction gas atmosphere containing an element constituting a portion of the intended ultra-fine ceramic particles,
   injecting a metal powder constituting a remaining portion of said intended ultra-fine ceramic particles into said plasma jet at a rate of not less than 70 grams per minute to vaporize said metal powder by the heat of said plasma jet and to react the resulting vaporized metal with said element contained in said reaction gas atmosphere for synthesizing said intended ultra-fine ceramic particles, and
   gathering the resulting ultra-fine ceramic particles.

2. A method according to claim 1, wherein the metal forming said metal power is selected from the group consisting of silicon, titanium, zinc, magnesium, manganese chromium, vanadium, aluminum and a mixture thereof.

3. A method according to claim 1, wherein the particle size of said metal powder is not more than 400 microns.

4. A method according to claim 1, wherein said element is selected from the group consisting oxygen, nitrogen, and carbon.

5. A method according to claim 1, wherein said reaction gas is selected from the group consisting of gaseous oxygen, gaseous nitrogen, gaseous ammonium, gaseous hydrocarbon and a mixture thereof.

6. A method according to claim 1, which further comprises introducing said metal powder by means of a carrier gas.

7. A method according to claim 6, wherein said carrier gas is selected from the group consisting of reaction gas and inert gas and a mixture thereof.

8. A method according to claim 1, wherein said step of introducing said metal powder further comprises continuously introducing said metal powder into said plasma jet.

9. A method according to claim 1, wherein said step of introducing said metal powder further comprises intermittently introducing said metal powder into said plasma jet at intervals not exceeding one second.

10. A method according to claim 1, wherein said rate of injection is not less than 180 grams per minute.

* * * * *